(12) United States Patent
Garner et al.

(10) Patent No.: US 6,337,472 B1
(45) Date of Patent: Jan. 8, 2002

(54) LIGHT IMAGING MICROSCOPE HAVING SPATIALLY RESOLVED IMAGES

(75) Inventors: Harold R. Garner, Flower Mound; Roger A. Schultz, Plano, both of TX (US)

(73) Assignee: The University of Texas System Board of Regents, Austin, TX (US)

(*) Notice: Subject to any disclaimer, the term of this patent is extended or adjusted under 35 U.S.C. 154(b) by 0 days.

(21) Appl. No.: 09/174,938

(22) Filed: Oct. 19, 1998

(51) Int. Cl.[7] .................................................. G02B 7/04
(52) U.S. Cl. .................................. 250/201.3; 250/208.1
(58) Field of Search ........................ 250/201.3, 201.5, 250/208.1, 306, 307; 356/301, 311, 237.2, 326, 328

(56) References Cited

U.S. PATENT DOCUMENTS

| | | | |
|---|---|---|---|
| 5,148,288 A | 9/1992 | Hannah | 358/298 |
| 5,157,506 A | 10/1992 | Hannah | 358/298 |
| 5,159,199 A | 10/1992 | LaBaw | 250/339 |
| 5,166,755 A | 11/1992 | Gat | 356/419 |
| 5,218,473 A | 6/1993 | Seddon et al. | 359/589 |
| 5,363,318 A | 11/1994 | McCauley | 364/571.01 |
| 5,461,477 A | 10/1995 | Marinelli et al. | 356/352 |
| 5,483,335 A | 1/1996 | Tobias | 356/310 |
| 5,528,368 A | 6/1996 | Lewis et al. | 356/346 |
| 5,539,517 A | 7/1996 | Cabib et al. | 356/346 |
| 5,638,173 A * | 6/1997 | Smith et al. | 356/301 |
| 5,689,333 A * | 11/1997 | Batchelder et al. | 356/301 |
| 5,703,357 A | 12/1997 | Shih et al. | 250/226 |
| 5,714,759 A | 2/1998 | Nelson | 250/343 |
| 5,760,899 A | 6/1998 | Eismann | 356/326 |
| 5,784,162 A | 7/1998 | Cabib et al. | 356/346 |
| 5,793,545 A | 8/1998 | Monfre et al. | 359/891 |
| 5,817,462 A | 10/1998 | Garini et al. | 435/6 |
| 5,824,567 A | 10/1998 | Shih et al. | 438/73 |
| 5,872,655 A | 2/1999 | Seddon et al. | 395/588 |
| 6,040,907 A * | 3/2000 | Steiner et al. | 356/311 |
| 6,067,154 A * | 5/2000 | Hossain et al. | 356/237.2 |

OTHER PUBLICATIONS

SpectraCube™, Irit Bar–Am, Sara Lavi, Y. Garini, N. Katzir, D. Cabib, R.A Buckwald, D.G. Soenksen, Z. Malik, X.F. Wang, Herman Brian, John Wiley and Sons, Inc., David H. Ledbetter, P.M. Nederlof, S. Van der Flier, J. Wiegant, A.K. Raap, H.J. Tanke, J.S. Ploem and M. van der Ploeg, T. Reid, A. Baladini, T.C. Rand and D.C. Ward, Applied Spectral Imaging, Inc., May 7, 1996, pp. 1–3.

Fourier transform multipixel spectroscopy for quantitative cytology, Z. Malik, D. Cabib, R.A. Buckwald, A. Talmi, Y. Garini and S.G. Lipson, Journal of Microscopy vol. 182, Pt. 2, May 1996 pp. 133–140.

Sample Preparation and In Situ Hybridization Techniques for Automated Molecular Cytogenetic Analysis of White Blood Cells, Frans M. van de Rijke, Hans Vrolijk, Willem Sloos, Hans J. Tanke, and Anton K. Raap, Wiley–Liss, Inc. 1996 Cytometry 24:151–157(1996). (Month unknown).

(List continued on next page.)

*Primary Examiner*—Que T. Le
(74) *Attorney, Agent, or Firm*—Gardere Wynne Sewell LLP; Sandford E. Warren, Jr.; Edwin S. Flores (57) ABSTRACT

A filter-less imaging microscope and method for analyzing samples on a slide at multiple wavelengths of light comprising, a microscope (12), a light dispersive element (28) positioned to receive images from the microscope (12) at multiple wavelengths, the light dispersive element (28) producing an array of light from the image and a camera (30) positioned to detect the light array produced by the light dispersive element (28), wherein the camera (30) detects the light array dispersed by the light dispersive element (28) at multiple wavelengths, is disclosed. The camera (30) can detect the entire spectrum of light produced by the light dispersive element (28).

44 Claims, 4 Drawing Sheets

OTHER PUBLICATIONS

Automation of Spot Counting in Interphase Cytogenetics Using Brightfield Microscopy, Hans Vrolijk, Willem C.R. Sloos, Frans M. van de Rijke, Wilma E. Mesker, Hans Netten, Ian T. Young, Anton K. Raap, and Hans J. Tanke, Wiley–Liss, Inc. 1996, Cytometry 24:158–166(1996). (Month unknown).

A Strategy for Multiple Immunophenotyping by Image Cytometry: Model Studies Using Latex Microbeads Labeled with Seven Streptavidin–Bound Fluorochromes, Andre Gothot, Jean–Claude Grosdent, and Jean–Michel Paulus, Wiley–Liss, Inc. 1996. Cytometry 24:214–225(1996). (Month unknown).

Hardware and Software Requirements for Quantitative analysis of Comparative Genomic Hybridization, Stanislas du Manoir, Olli–P. Kallioniemi, Peter Lichter, Jim Piper, P.A. Benedetti, A.D. Carothers, J.A. Fantes, J.M. Garcia–Sagredo, T. Gerdes, M.Giollant, B. Hemery, J. Isola, J. Maahr, H. Morrison, P.Perry, M. Stark, D. Sudar, J.J. van Vliet, N. Verwoerd, and J. Vrolijk, Wiley–Liss, Inc. 1995. Cytometry 19:4–9(1995). (Month unknown).

Computer Image Analysis of Comparative Genomic Hybridization, Jim Piper, Denis Rutovitz, Damir Sudar, Anne Kallioniemi, Olli–P. Kallioniemi, Frederic M. Waldman, Joe W. Gray,and Dan Pinkel, Wiley–Liss, Inc. 1995. Cytometry 19:10–26(1995). (Month unknown).

Quantitative Analysis of Comparative Genomic Hybridization, Stanislas du Manoir, Evelin Schrock, Martin Bentz, Michael R. Speicher, Stefan Joos, Thomas Ried, Peter Lichter, and Thomas Cremer, Wiley–Liss, Inc. 1995. Cytometry 19:27–41(1995). (Month unknown).

Image Analysis in Comparative Genomic Hybridization, Claes Lundsteen, Jan Maahr, Britta Christensen, Thue Bryndork, Martin Bentz, Peter Lichter, and Tommy Gerdes, Wiley–Liss, Inc. 1995. Cytometry 19:12–50(1995). (Month unknown).

Semiautomated DNA Probe Mapping Using Digital Imaging Microscopy: I. System Development, Laura N. Mascio, Piet W. Verbeek, Damir Sudar, Wen–Lin Kuo, and Joe W. Gray, Wiley–Liss, Inc. 1995. Cytometry 19:51–59(1995). (Month unknown).

Semiautomated DNA Probe Mapping Using Digital Imaging Microscopy: II. System Performance, Masaru Sakamoto, Daniel Pinkel, Laura Mascio, Damir Sudar, Donald Peters, Wen–Lin Kuo, Kazuhiro Yamakawa, Yusuke Nakamura, Harry Drabkin, Zeljiko Jericevic, Louis Smith, and Joe W. Gray, Wiley–Liss, Inc. 1995. Cytometry 19:60–69(1995). (Month unknown).

Cytogenetic profiling Using Fluorescence In Situ Hybridization (FISH) and Comparative Genomic Hybridization (CGH), Curtis T. Thompson, MD[1,2] and Joe W. Gray, PhD[1], Journal of Cellular Biochemistry 17G:139–143(1993). (Month unknown).

Comparative Genomic Hybridization: An Overview, Jane Houldsworth and R.S.K. Chaganti, American Journal of Pathology, vol. 145, No. 6, pp. 1253–1260, Dec. 1994.

Cytogenetics: New Methods for Expanding The Chromosomal Paint Kit, Jeam Marx, Science vol. 273, pp. 430, Jul. 26, 1996.

Multicolor Spectral Karyotyping of Human Chromosomes, E. Schrock, S. du Manoir, T. Veldman, B. Schoell, J. Wienberg, M.A. Ferguson–Smith, Y. Ning, D.H. Ledbetter, I. Bar–Am, D. Soenksen, Y. Garini and T. Ried, Science, vol. 273, pp. 494–497, Jul. 26, 1996.

Karyotyping human chromosomes by combinatorial multi–fluor FISH, Michael R. Speicher, Stephen Gwyn Ballard and David C. Ward, Nature Genetics, vol. 12, pp. 368–375, Apr. 1996.

* cited by examiner

LIGHT IMAGING MICROSCOPE HAVING SPATIALLY RESOLVED IMAGES

TECHNICAL FIELD OF THE INVENTION

The present invention relates in general to the field of biological sample analysis, and more particularly, to an apparatus and method for observing, identifying and quantifying a biological sample through a microscope using the entire spectrum of light, concurrently and in real time.

BACKGROUND OF THE INVENTION

Without limiting the scope of the invention, its background is described in connection with the observation and analysis of nucleic acid, amino acid, small molecular and/or cellular samples using fluorescence-based microscopy, as an example.

Heretofore, in this field, fluorescence imaging of biologically relevant samples has had an enormous impact on the clinical identification of disease conditions and their prognosis. Likewise, basic research has benefitted from the ready availability of fluorescence-based imaging dyes and image capture systems. In the clinic, developments in immunohistochemistry by fluorescent imaging using fluorescence in situ hybridization (FISH) or comparative genomic hybridization (CGH) have opened new avenues in the identification of chromosomal aberrations from tissue biopsies. In basic research, fluorescence microscopy may be used to detect the presence of markers using techniques such as, e.g., fluorescence or enzymatic labeling, to detect the presence or absence of binding to a component of the sample which has been immobilized.

One such fluorescence-based system is known as Spectral Karyotyping (SKY), which uses Fourier Transform Imaging Spectroscopy Microscopy. In SKY microscopy a continuum of spectra are taken, but require a filter set that is specific for the dye used. The hyperspectral image produced and deconvoluted also requires the use of dyes having known emission spectra and filters adapted therefor. The SKY system deconvolutes images using a two-step process. First, an image is acquired after passage through dye-specific filters into a Sagnac Interferometer followed by inverse-Fourier transform calculations. The interferometry, however, depends on the shape of the bandpass filter and is therefore limited to specific dye-filter sets that exclude photons outside the bandfilter are used. The effect of excluding photons close to the filter wavelength is that sensitivity is sacrificed, but is necessary, due to the intrinsic limits of the Sagnac interferometer. Furthermore, the SKY system fails to account for variation in the quality of filters. The lack of dimensional stability, due to susceptibility in image registration and difficulties in lateral coherence, also requires that the user of the SKY system continuously adjust and monitor the system optics.

SUMMARY OF THE INVENTION

It has been found, however, that present apparatus and methods fail to meet the demand for a low cost, efficient, customizable imaging microscope that is capable of overlapping, concurrent data acquisition and analysis over the entire spectrum of light. A problem found in alternative systems is that they are only capable of imaging a limited number of dyes with high quality filters. Another problem with available systems is that constant monitoring and adjustments in the system optics is required, increasing the mechanical complexity of the system.

Further, current systems can not make simultaneous measurements at different wavelengths and thus cannot measure multiple parameters simultaneously. Present systems can not accurately correlate parameters (or measurement conditions) that are changing with time (e.g., due to bleaching), thereby losing sensitivity while an area of interest is being selected and each wavelength is measured.

The hyperspectral imaging microscope of the present invention is designed to greatly enhance the signal, spectral range and sensitivity of microscopic imaging in order to aid, e.g., the clinical technician to evaluate karyotypes for cancer evaluation. In the clinical setting, for example, the microscope disclosed herein allows the cytogeneticist to evaluate a large number of potential genetic abnormalities simultaneously and with high sensitivity.

The hyperspectral imaging microscope (HIM) disclosed herein may record the entire emission spectra of a sample. The microscope of the present invention may be used with or without a set of unique marker specific for detection of chromosomal abnormalities. In fact, the microscope can be used without any dye marking of the sample and be used using plain light. The microscope can be used as part of a Hyperspectral Image Cytogenetics (HIC) system, in which the protocols and the probe set disclosed herein enable the clinical and research cytogeneticist to quickly and accurately gauge chromosomal rearrangements, deletions and duplications with greater accuracy than previously possible using optical microscopy.

The microscope may be constructed using an imaging spectrograph, a cooled high-resolution CCD camera and a raster system. When a sample is fluorescently tagged, the microscope is capable of analyzing samples hybridized with a large set of distinctly tagged probes. Because the entire wavelength spectra may be taken simultaneously, the microscope is able to resolve, spectrally, a large number of emission spectra, whether dyes are used or not. When using dyes with a broad emission spectra, the microscope is capable of capturing the entire broad spectra. The microscope, however, is also able to distinguish close peak spectral spacing, as well as, spectra of compressed samples where dye positions overlay spatially or are very close.

The sensitivity of the system is also improved because the entire spectra of a fluorochrome may be captured. By means of comparison, a filter based epi-fluorescence microscope passes only a narrow passband window of light. Additional benefits of the microscope disclosed herein include, single scan for all wavelengths, no dye specific hardware (emission filters), extendable to near IR, may be automated, and may be used with current FISH and CGH methods. Filters, however, may be included for specific applications.

The present invention is an apparatus for imaging samples that includes a microscope positioned to hold a sample, generally disposed on a slide, in the path of light. A light dispersive element, such as an imaging spectrograph, is positioned to disperse the light emitted from the sample into a light spectrum. Following the interaction of the light line with the sample, a camera detects the light spectrum produced by the light dispersive element to determine the components of light emitted by the sample. The microscope may be, e.g., an epi-fluorescence or an inverted microscope. The camera may be, e.g., a charge coupled device (CCD) camera. A light amplification device, such as a microchannel plate amplifier, may be placed between the light dispersive element and the camera to improve the sensitivity of this system.

Light sources for use with the present invention may include the light generally associated with the microscope or lasers, lamps, or combinations thereof. Examples of lasers that may be used include: argon ion lasers, diode-pumped solid state lasers, pulsed nitrogen dye lasers, helium-neon lasers or a combination thereof. Lamps for use with the invention include: white light lamps, broadband ultraviolet lamps, mercury lamps, zenon lamps, or combinations thereof. When the sample are stained, the light source may be selected depending on the dye or dyes used to stain the samples on the slide.

In one embodiment of the present invention, the light may be further defined as including a continuum or spectrum of light. The light dispersive element for use with the present invention may be an imaging spectrograph. Also, an astigmatism correcting lens may be positioned between the microscope and the imaging spectrograph. The microscope may include a linear motion drive slide mount, or a linear motion slide mount attached to a light reflective element, such as a collimator or a total internal reflection mirror. The hyperspectral imaging microscope may further include a data acquisition system connected to the camera, wherein the data acquisition system stores and correlates results based on the input acquired by the camera.

The camera of the present invention may be used to detect changes in absorbance of light following the interaction of light with a sample. The camera may, alternatively, detect the reflection of light following the interaction of light with the sample on all or a portion of a slide, or the emission of a fluorochrome.

The present invention also includes a method of scanning samples on a slide in multiple wavelengths including the steps of, generating one or more wavelengths of light, illuminating at least one sample on a microscope with the light, splitting the light into a two dimensional array of light and detecting the two dimensional array of light.

Samples for detection using the apparatus and method of the present invention include biological and materials sciences samples. By material sciences it is meant that samples are primarily of inorganic origin, e.g., materials used for semiconductor manufacture. An example of a semiconductor sample is a dye cut or punch for auger analysis. The hyperspectral imaging microscope may also be used for the study of environmental samples, e.g., high definition analysis of contaminated deposits.

When using the present invention to observe and quantitate biological samples, the samples may be completely unstained, or may be stained using, e.g., a fluorescent dye. The samples may be, e.g., intact or fixed cell, cells grown on slides or histological samples. Techniques used to stain the samples may be, e.g., stained using fluorescence in situ hybridization or comparative genomic hybridization techniques. Alternatively, the biological samples may be tagged antibodies or other proteins (e.g., ligands for cell surface receptors), ion sensitive dyes, intercalating dyes, nucleic acid stains, and the like. The hyperspectral imaging microscope may be used for time-dependent studies that require measurements at several timepoints. It may also be used to study arrays that are used for sequencing, such as, re-sequencing matrices.

The apparatus and method disclosed herein may also be used in clinical settings for fluorescence in situ hybridization (FISH) of cancer cell cytogenetics to establish a molecular basis for diagnosis (single copy probes directed at oncogenes) and the evaluation of complex translocations (whole chromosome painting probes). The apparatus and method may also be used to predict the accelerated phase of disease (centromeric probes on interphase nuclei), monitoring engraftment after bone marrow transplantation (chromosome X and Y probes) and even for the evaluation of marker chromosomes (centromeric or painting probes). Probes for use with the present invention include, but are not limited to, any dyes or molecules that affect light dispersion, emission, reflection, absorbance, emission shifts, energy transfer and the like.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Fluorescence imaging on the microscope is a powerful technology with an enormous impact in both clinical diagnostics/prognostics and basic biomedical research. In the clinical arena, for example, immunohistochemistry has improved by the use of fluorescence microscopy. Clinical cytogenetics has experienced a tremendous increase in requests for fluorescence in situ hybridization (FISH) analysis of both cancer and non-cancer samples to evaluate chromosomal changes. These applications have supported significant increase in the demand for computer-based fluorescence microscopy imaging systems and related fluorescent probes. Present systems employ a narrow band optical filter(s) to aid image collection and analysis, a design that restricts the sensitivity of analysis and precludes the use of many, or even multiple, fluorochromes.

As disclosed herein, the present invention can be a filter-free fluorescence or non-fluorescence microscopy imaging system based on hyperspectral imaging. The system may be constructed using, e.g., an epi-fluorescence microscope, an imaging spectrograph and a high-resolution charge-coupled device (CCD) camera and raster system. Software facilitates the automated single-scan capture and analysis of all wavelengths. The sensitivity, reliability and simplicity of operation of the system may be evaluated by direct comparison to conventional filter-based systems in the analysis of chromosomal anomalies previously shown to have relevance to cancer.

The hyperspectral imaging microscope may be used to visualize multiple dyes during fluorescence in situ hybridization (FISH) analysis. FISH is based on the hybridization of DNA probes to chromosomes, facilitating their examination. Examples of the clinical utility of FISH in cancer cytogenetics include: establishment of a diagnosis (single copy probes directed at oncogenes); evaluation of complex translocations (whole chromosome painting probes); prediction of an accelerated phase of disease (centromeric probes on interphase nuclei); monitoring engraftment after bone marrow transplantation (chromosome X and Y probes); and evaluation of marker chromosomes (centromeric or painting probes).

The present invention may also be used to analyze molecular cytogenetics using standard chromosome painting. FISH, for example, can be used with improved protocols for the isolation of interphase nuclei to better identify genetic abnormalities. Interface in situ analysis, however, suffers from a number of limitations, including significant false results and the inability to analyze the entire genome of a single cell.

As an alternative to FISH, comparative genomic hybridization was developed to more completely analyze karyotypes. In spite of the significant scientific progress and technical improvements, CGH also has limitations including potential sample contamination with normal cells, failure to detect non-numerical abnormalities, and poor limits of resolution. The successes and limitations of interphase FISH and CGH have spurred a renewed interest in achieving FISH results on metaphase chromosomes with greater quality and complexity.

One recent development is the use of FISH on chromosomes with complex multicolor probes, which permit assessment of the entire genome from a single metaphase spread. While FISH was used to analyze libraries representing each of the twenty four chromosomes that were differentially labeled with different combinations of five fluorochrome-labeled nucleotides, very specific dyes having defined emission wavelenghts were used. Similar experiments were performed with twenty four combinatorial chromosome painting probes, which is currently marketed as Spectral Karyotyping (SKY).

Unlike the Fourier Transform-based systems, the present invention captures a full spectrum hyperspectral image that is fully three dimensional. An X-Y spatial image at an arbitrarily large number of wavelengths can be captured and the individual signature of differing emitting bodies identified using spectral decomposition. Spectral decomposition is the process by which individual components (e.g., emission spectra of dyes) can be uniquely separated from a composite (full spectral) image by knowing the signature of each component measured separately (e.g., dye emission spectra). Spectral decomposition is generally performed using standard spectral decomposition algorithms.

The hyperspectral imaging microscope disclosed herein may be used to acquire an image cube (dimensional characteristics: X position, Y position and wavelength) by scanning a sample using an imaging spectrograph and a camera. Optionally, a light amplifier may be used to amplify the light prior to reaching the camera. The image acquired may include the entire spectrum of light by using multiple light sources (e.g., white light, Argon-ion laser, Helium Neon Laser, solid state 532 nm laser, pulsed nitrogen laser with dye cell and doubler, mercury vapor lamps and/or Xenon vapor lamps).

Optics (relay mirrors, lens, line generators and cylindrical lens) may be used to convert the light source output into a line that is projected onto the sample via the objective. This line source greatly increases the sensitivity of the microscope and generally reduces the bleaching of sample dyes by limiting exposure to the area in acquisition. By using particular optic sets, the user can quickly change all sources using kinetic bases and optics supports. Likewise, additional optics (mirrors, slits and cylindrical lenses) may be used after the light line interacts with the sample to transmit and image the light acquired from the sample via the objective to an imaging spectrograph slit. The superposition of the gaussian line illumination source and gaussian imaged output fluorescence light provide a significant to improvement in spatial resolution. Additional filters may, optionally, be installed between the microscope and the slit of the imaging spectrograph to block illumination sources at selected wavelengths to reduce the background light. Optional filters may also be placed between the light sources and the microscope objective to select only certain wavelengths for fluorescence excitation.

The sample may be scanned via a motorized microscope stage controlled by the computer or by sliding a mirror, e.g., total internal reflection mirror, within the microscope to scan across the surface of a sample. The resolution of the scan may depend on, e.g., the stepping capabilities of the stage, the quality of the optics and the superposition effect produced thereby. The motorized stage or mirror system of the hyperspectral imaging microscope may scan in two dimensions allowing the scanning of an entire surface of a slide at high spatial and spectral resolution. Under software control, regions may be re-scanned using different light sources, different spectral emission characteristics (dispersion and center wavelength) and different magnifications. Also under software control, different slides may be evaluated at the same location(s) or a previously viewed slide can be reevaluated at the same site.

Transmitted light may also be measured to create an absorption spectral image or signature. For example, when using plain white light, an unstained sample can be imaged to determine the extent of light absorbed by the sample. Light absorption may be used to differentiate between malignant and benign tumors, as well as, to identify cell type and source. Furthermore, the transmitted light image may also be superimposed on another image or be used to select a region of interest for additional scanning. Also, the reflection of light may be examined to create an absorption spectral image.

Samples for detection using the apparatus and method of the present invention include biological and materials sciences samples. By material sciences it is meant that samples are primarily of inorganic origin, e.g., materials used for semiconductor manufacture. An example of a semiconductor sample is a dye cut or punch for auger analysis.

If the samples are biological, the samples may be completely unstained or may be stained using, e.g., a fluorescent dye. The samples may be, e.g., cells grown on slides or histological. The samples may be on, e.g., slides, microtiter plates, cell culture or bacterial culture plastic or glassware or other sources on which samples to be analyzed might be grown, mounted or fixed. Techniques used to stain the samples may be may be, e.g., stained using fluorescence in situ hybridization, comparative genomic hybridization, tagged antibodies, ion sensitive dyes, nucleic acid stains, and the like. Biological samples may include histological samples derived from solid tissue or body humors, e.g., blood, spinal fluids and the like. The biological samples may also be processed in a laboratory prior to analysis, using techniques such as tissue culture.

By "stain" it is meant that there is a change in the spectral characteristics of an area of interest in comparison to the surrounding area. For example, the hyperspectral imaging microscope is able to detect intrinsic fluorescence, intrinsic absorption, or intrinsic reflectivity of a sample, in which natural features of the sample are "stained" in comparison to adjacent areas. A stain may also be a label, probe, or tracker, which includes those compounds that have chemiluminescent and bioluminescent characteristics. A stain may even be, e.g., a gold particle attached to a probe.

The hyperspectral imaging microscope may also be used to resolve different fluorochromes with overlapping and similar emission spectra by using spectral decomposition algorithms based on user-generated standard dye spectra (for each dye and illumination source). The hyperspectral imaging microscope is capable of acquiring and storing a library of spectra, which may be continuously expanded as new dyes or light sources become available. Even samples labeled with dyes that overlap spatially (or are smaller than the resolving power of the optics) can be differentiated by spectral decomposition. Furthermore, the output of each decomposed dye emission image may be viewed and superimposed with other dye intensity images (e.g., in false color) to improve the user's ability to visualize the difference.

Emission may also be differentiated, in software, by creation of artificial spectral windows or filters and viewed in false color. While the creation of artificial spectral windows mimics standard filter-based fluorescence microscope, standard filter-based microscopy suffers from the inability to differentiate overlapping spectra caused by spillover of the spectral energy from dyes that have broad and overlapping (similar) emission spectra. The inability to differentiate spectra is further complicated by the large background often associated with standard filter-based fluorescence microscopy.

Software may also be used to view and select regions of interest for re-scanning. Software control is particularly useful for scanning at high resolution (high magnification) after identification of a feature of interest at low magnification (larger viewing area). Furthermore, the hyperspectral imaging microscope may be used to automate and rapidly re-scan regions of interest. The ability to conduct continuous exposures or time dependent exposures and view them continuously is valuable for observing time-dependent emission but can also be of value for calibration, alignment or optimization of optics or scanning parameters. Automated re-scanning also enables time dependent monitoring of evolving spectra and intensity for monitoring changing systems (biological, chemical, etc.). As an example, the hyperspectral imaging microscope may be used to observe and quantitate the time dependent opening and closing of one or more ion channels on the same cell concurrently and in real-time.

Both software and hardware may be employed to facilitate locating or finding an area for analysis. When analyzing a biological sample, for example, the cells, chromosomes or other molecules of interest may be found by automating the scanning of the sample holder to focus in on areas of interest without the need to manually scan the sample or samples. Visual aids may include a video camera and monitor to allow the user, e.g., using a joystick, to manually move and scan a sample or samples. A joystick may be particularly useful when scanning a large area such as the wells within a microtiter plate or an entire petri dish. Software may be written that aids in finding, within a sample, objects of interest based on size, shape, structure or wavelength characteristics (emissions or absorption, fluorescent, IR or visible). The movement of the sample or the optics may employ automated motion and stopping hardware.

When scanning a sample slide or plate having one or more wells, software may be provided that allows for a continuous scan of an entire region or regions. The magnification level and speed of the scan may be varied depending on the stage in the analysis, for example, a preliminary scan may be conducted at low magnification to preselect wells for in-depth analysis at a higher magnification. The hyperspectral imaging microscope can be programmed, for example, to receive via robotics plates that are then scanned from well to well, automatically focusing, capturing and storing image data from each plate in a completely automated process.

The images captured using the hyperspectral imaging microscope may be saved in a variety of formats including TIFF, PICT and other standard fonnats. The images in standard formats may be made available to other scientists via, e.g., the Internet, to aid in collaborations or to publish and view the results electronically. Images may be analyzed using zoom, re-scanning, select region of interest for analysis, scaled in each dimension, and/or viewed in three-dimensions. The images may also be printed, cut, and pasted. Compression algorithms may be applied to the data to reduce the size of the saved files. From the saved data, any given point, or group of points, in a region of interest may be displayed and analyzed, including a graphic display with peak indicators, spectral coverage and intensity.

The hyperspectral imaging microscope may be used to with a large number of dyes to spectrally and spatially resolve them within, or about, samples. Where the samples are stained, the techniques used for staining and type of sample analysis may include: FISH, DIRVISH, cytogenetics, karyotyping, histology, immunohistology, cellular analysis, materials analysis, array (spotted, hybridization, oligonucleotide, peptide, small molecule, photosynthetic) scanning, high resolution genetic analysis for loss or rearrangements of genetic regions. For example, images of DNA probes hybridized to metaphase chromosomes by FISH may be captured and analyzed using the filter-less, single-image analysis disclosed herein. While filters may be employed with the hyperspectral imaging microscope to block background or restrict image analysis to selected wavelengths and/or fluorochromes, as in traditional filter-based FISH, it is not required in the system of the present invention. The use of appropriate software also extends the applications that may be used with the present invention to, e.g., the comparative genomic hybridization (CGH) analysis.

The hyperspectral imaging microscope may also be used to capture images of chromosomes following the application of either fluorescent or visable wavelength banding techniques. The hyperspectral imaging microscope also permits automated cytogenetic evaluation including karyotyping and the detection of structural or numerical aberrations, either independently or in combination with FISH probes.

Additional molecules that may be used as probes and reagents for hyperspectral microscope imaging using the apparatus and method disclosed herein may include: antibodies, peptide nucleic acids (PNAs) and the broad range of organic and non-organic bioreactive and biodetection molecules such as biological stains or bio-reactive molecules with known or even unknown fluorescence or visible wavelength characteristics. If the characteristics are unknown, the hyperspectral imaging microscope may be used to obtain and store a standard for subsequent analysis using the heretofore unknown spectral characteristics of a molecule. A number of reagents for staining biological samples are sold by Merck Ltd. or Molecular Probes that may be used with the hyperspectral imaging microscope, which may include applications for: histology, certistains, hematology, immunochemistry, cytology, molecular biology, biochemistry, neuroscience, cell biology, microbiology, virology, and diagnostics. Examples of the mechanisms of these reagents include, for example, ion indicators, caged probes, fluorescence microspheres, microscope and flow cytometry standards and cross-linking agents.

Samples that may be scanned and evaluated using the hyperspectral imaging microscope include: tissue sections, body fluids, cultured cells and cell suspensions, individual cells or cellular organelles for resolving cellular regions, cells or cell types or subcellular structures marked with specific agents indicative for certain characteristics including diagnostics that are medical, biological or clinical. Samples may also include certain cells, biological components or biological bodies (beads, membranes, selectively bound to beads or other indicators, etc.) that are inspected and then differentiated by their individual spectral signature. The spectral signatures may then be used to redirect inspection to a region of interest for closer examination. Examples include: differentiating normal or abnormal cells on the basis of cell cycle position, cell viability and death, or cell age, as well as numerous applications that differentiate normal and abnormal cells and cell structures. For example, the hyperspectral imaging microscope may be used to study cellular differentiation of C. elegans over a period of time.

Probes for use with the present invention include, but are not limited to, any dyes or molecules that affect light dispersion, emission, reflection, absorbance, emission shifts, energy transfer and the like. The hyperspectral imaging microscope may be used with genetic analysis to identifying a large number of indicative regions via marking of a large family of distinct probes with distinct dyes labels. Probes may include: PCR products, oligonucleotides, cosmid, plasmid, PAC, BAC, YAC and other labeled nucleic acids (DNA, RNA and mimics) that have been previously (or not) linked to particular regions. Probes may also include small molecules, peptides or carbohydrates. For example, tagged antibodies may be used to visualize cell surface receptors.

Another example of probes is the use of small molecules or drugs that are labeled to visualize binding to ligands in intact cells. The actual combination of a tag or tags to a specificity element are known to those of skill in the art of molecular tagging. By labeling distinct probes with distinct dyes the hyperspectral imaging microscope may be used to resolve small deletions, duplications or rearrangements of chromosomes (either compressed or dispersed). Another example is the use of acridine orange to detect the shift in spectra between double stranded and single stranded DNA.

Figure 1:
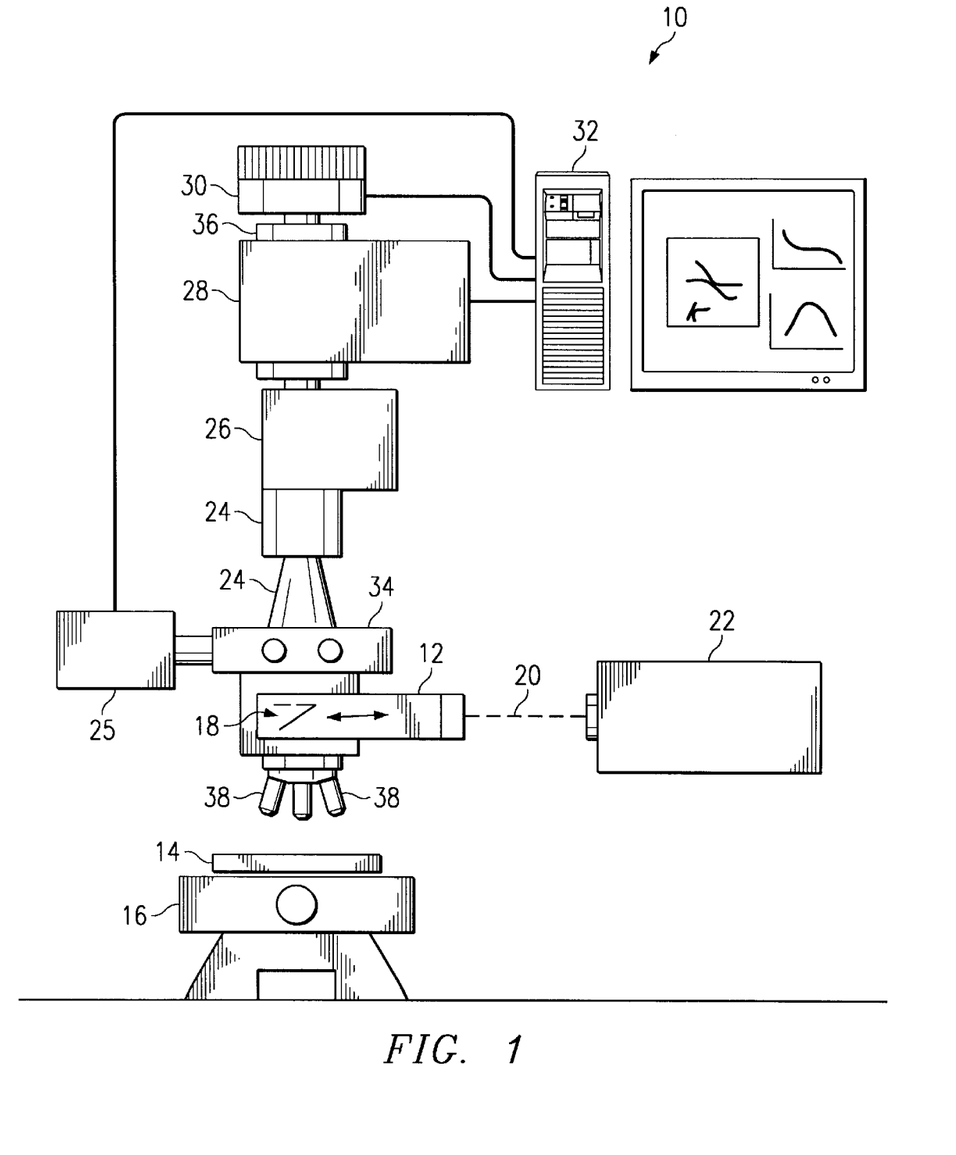
FIG. 1 is a diagram of basic physical components of a hyperspectral imaging microscope with independent illumination and detection.

FIG. 1 is a simplified drawing of a hyperspectral imaging microscope, generally designated 10. A microscope 12, such as a standard epi-fluorescence microscope may be used to hold a slide 14 or slides having samples thereon. The epi-fluorescence microscope 12 may be, e.g, a Zeiss Axioplan 2 or an Olympus inverted microscope. The slide 14 may be placed on a standard microscope stage 16, which will generally include X, Y and Z dimension controls, as well as a light whose lighting characteristics may be varied. A laser line generator and collimator 18 is positioned to convert light 20 entering the light line generator and collimator 18 into a light line. In one embodiment, the light line generator and collimator 18 may be a computer controlled with a linear drive mechanism and may be configured to scan a light line across at least a portion of the surface of a slide 16.

A light source 22 provides light 20 to a sample on the slide 14. Light 20 entering the microscope 12 can be attached to an auxiliary port or may be integral with the microscope 12. Next, spectrograph coupling optics 24 are depicted positioned to direct light passing through the microscope lenses into an imaging spectrograph 28. Astigmatism correction lenses 26 may be interposed between the microscope 12 and the imaging spectrograph 28 to improve image resolution. A camera 30, such as a cooled charge-coupled device (CCD) camera, captures the image produced by the light dispersive elements within the imaging spectrograph 28. Once dispersed, a light amplifier 36, may be placed between the imaging spectrograph 28 and the camera 30. The light amplifier 36 may be used to improve the sensitivity of the system. The spectrum of light generated by the imaging spectrograph 28 (and amplified by the light amplifier 36, if present) is reflected into camera 30.

A precision 1-D computer controlled light line generator and collimator 18 may be used to control the position and motion of the light line generator and collimator 18. The microscope 12 objective lenses 26 may be varied in magnification depending on the size of the image(s) to be acquired and the quality of image necessary. For example, a low magnification will generally be used when scanning the entire surface of a slide during a preliminary scan to pre-identify regions of the slide for further analysis.

The imaging spectrometer 28, the camera 30 and the stage 16, may be connected to a image processing computer 32 that may control part of, or the entire, hyperspectral imaging microscope 10 system. After wavelength dispersion, light amplifier 36 may be used to improve system sensitivity. A microchannel plate amplifier, which is sensitive to all wavelengths as input and produces a monochromatic output, may be used to preserve and amplify wavelength information as the spectrum of light is spread in space across the surface of camera 30. The light source 22, and the eyepiece 34, may be fit with standard filter cube sets and a computer controlled slide 14 stage 16 to allow the user to find images using standard visual techniques. The user may even view and evaluate the image directly though the eyepiece 34. Additional light sources may be added to the light 20 that enters the microscope 12 using, for example, kinetic mounted optics. Also, a video camera 25 may be mounted to capture a live image, in real-time, that may also be displayed through computer 32. The image from the video camera 25 may be viewed on the same or a separate monitor from that connected to computer 32.

The imaging spectrometer 28 may be an ARC imaging spectrograph and the camera 30 a Photometrix cooled CCD camera, which are mounted on the microscope 12 so images are focused on the slit of the imaging spectrograph 28. The camera 30 may be directly mounted to the imaging spectrograph 28 with pass-thru optics to acquire standard images directly from the microscope 12. An optical component, such as astigmatism correction lenses 26, may be used to transfer the image to the spectrograph and to slightly demagnify the image to match the aperture.

The third dimension (Y) of the image cube (X, Y, wavelength) may be generated by a 'push broom' motion of the light rays across the entrance slit of the imaging spectrograph 28. A precision 1-D computer-controlled scanning stage 16 assembly may be used to provide a microstepper capable of 0.01 micron steps, which is a step size far smaller than the defraction limit of, e.g., a laser light. By using a microstepper the system is not generally limited by motion. An Argon Ion laser may be used as the light source 22 because of the large family of dyes that match with the argon laser excitation wavelengths. Alternatively, a green HeNe laser may be used to create the submicron line necessary to illuminate the sample as it is moved on, or by, the stage 16.

A Photometrix Synsys 1600 camera controller may be directly attached to a computer 32 via, e.g., a SCSI port for "plug-and-go" operation. One advantage of the present invention is the ability to capture the entire spectrum by increasing the image bit depth. The data acquisition and analysis (visualization) computer 32 may be a Macintosh PowerPC 604/180 or an IBM PC. A printer, such as a dye sublimation printer to print in color (not depicted), may also be attached to the system for publication of high resolution images.

Software for use with the present invention may control the camera 30, the motion systems, collect images, and store the data. The software may also remove the background fluorescence and account for dead or irregular single pixel gain, as well as, curve or decompose the spectral dimension. Data visualization and analysis may also be provided in real-time by the computer 32. Finally, the computer 32 may allow for the conversion of data for export to other software packages.

Software for use with the present invention may be written in C, such as the HyperScope software, or in IPLab or Labview. The software may control the camera 30 and motion systems as currently implemented DNA sequencer systems. Data may be moved to the computer 32 under, e.g., HyperScope control. The software may also be used to remove background, monitor the laser and display parameters during data acquisition. For example, a 1536×1536 pixel spatial (X, Y) and 1024 deep spectral image (wavelength) cube may be acquired in about 4.1 minutes. If the spectral information is binned to 256 bins in the camera 30, the image may be acquired in approximately one minute. In the case of weak labeling, the dwell time may be increased to increase the data points of the scan. Curve fitting/decomposition is conducted using ANSI C routines. The captured data may be visualized using tools from a hyperspectral imaging analysis and display package. Alternatively, the software may be designed to export files in different formats for use with commercial karyotype analysis software.

One set of custom display software may have a 1024 color image display and zoom, pan, rotation, brightness and contrast adjustment and other standard windowing routines. Also, the software may provide for edge finding, region selection and manipulation, and FLP-ter measurements. As part of the overall image analysis system, mapping and distortion of the image may be used to expand a chromosome along its length for more accurate inspection. If the sample is fluorescently or otherwise labeled, the software may also be designed to provide automatic probe assignment (s) from known spectral signatures and image labeling. Software for use with the present invention may also be written to include complete automation, recognition and marking of chromosomes, automatic features for finding/recommending probes and clinical implications, and automatic scanning of slides.

Figure 2:
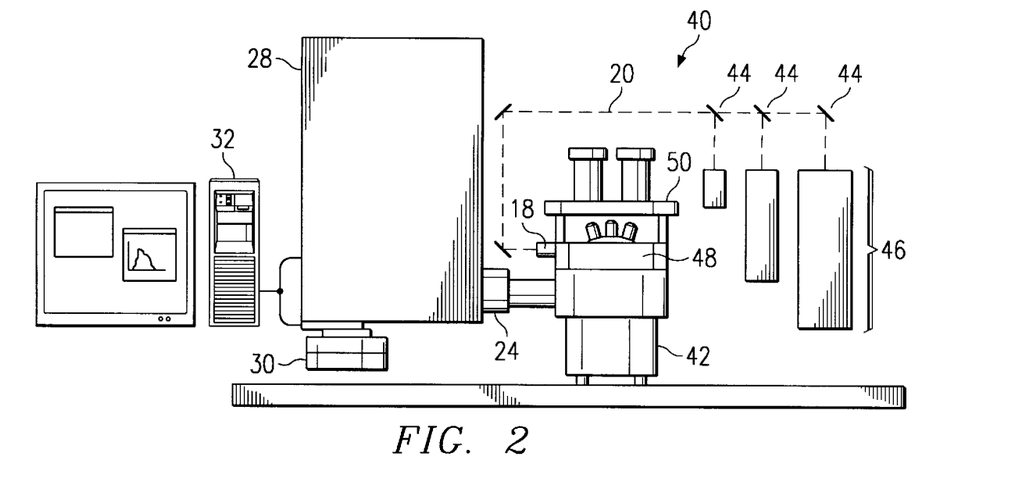
FIG. 2 shows an alternative embodiment for a hyperspectral imaging microscope.

FIG. 2 is a simplified drawing of a hyperspectral imaging microscope, generally designated 40. A microscope 48, such as a standard epi-fluorescence inverted microscope may be used to hold a slide or slides having samples thereon. The microscope 48 may be, e.g, an Olympus inverted microscope. The slide may be placed on a standard computer controlled motorized microscope stage and in one embodiment, the microscope stage may be a stage with a linear, two-dimensional drive and/or a self-focusing mechanism. A laser line generator and collimator 18 is positioned to convert light 20 entering the light line generator and collimator 18 into a light line. The light 20 may include the entire spectrum of light, which may be formed into light 20 by combining the output of various light sources 46 using kinetic mounted optics 44.

A light sources 46 provide light 20 to a sample on the slide that may be integral with the microscope 48. Next, spectrograph coupling optics 24 are depicted positioned to direct light passing through the microscope lenses into an imaging spectrograph 28. A camera 30, such as a cooled CCD camera, captures the image produced by the light dispersive elements within the imaging spectrograph 28. As with the embodiment depicted in FIG. 1, a light amplifier may be placed between the imaging spectrograph 28 and the camera 30.

A precision 1-D computer controlled optical scanning stage 50 may be used to control the position and motion of the slide. The microscope 48 objective lenses may be varied in magnification depending on the size of the image(s) to be acquired and the quality of image necessary. The imaging spectrometer 28, the camera 30 and the stage 16, may be connected to a image processing computer 32 that may control part of, or the entire, hyperspectral imaging microscope 10 system.

Figure 3:
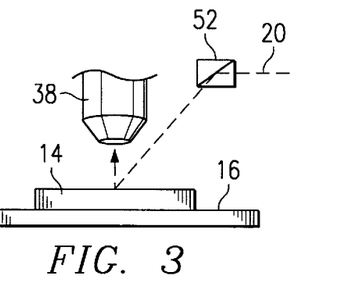
FIG. 3 shows a method of illumination for a hyperspectral imaging microscope.

FIG. 3 shows the light path used to direct light 20 onto a sample on slide 14, which is on a stage 16. The configuration depicted in FIG. 3 permits the capture of data based on the absorbance of the sample using light provided by the microscope in a variety of lighting conditions. The light 20 enters a collimator 52 that deflects the light 20 onto the sample. The sample captures the light and may reflects the light into objective lens 38. The magnification, if any, of objective lens 38 may be varied depending on the nature of the sample and/or scan.

Figure 4:
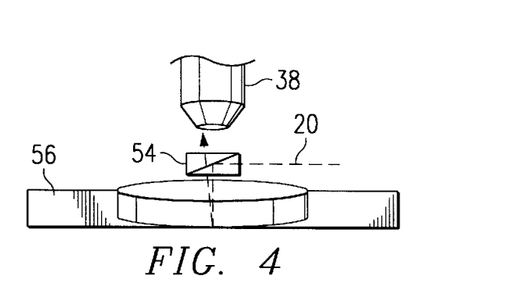
FIG. 4 shows another method of illumination for a hyperspectral imaging microscope.

FIG. 4 shows an alternative configuration for the light path used to direct light 20 onto a sample in a well on a plate 56 on stage 16. The plate 56 may be, for example, a petri dish, 2, 6, 12, 36, 96, 384-well plate or other size of plate having wells. Alternatively, a flow cell or cuvette (not depicted) may be positioned within the field of view of the objective lens 38. The light 20 enters a total internal reflection prism 54 that deflects the light 20 onto the sample. The light interacts with the sample and is generally reflected into objective lens 38. As with the configuration depicted in FIG. 3, the magnification, if any, of objective lens 38 can be varied depending on the nature of the sample and/or scan.

Probe Labeling and Detection

Probes may be labeled and used with the hyperspectral imaging microscope to detect features within or about a cell. Metaphase chromosome preparations of cells may be in situ labeled using standard procedures. Commercially available probes available from, VYSIS, ONCOR or Amersham may be used to paint all the individual chromosomes. For example, two different colors for each vendor may be used. Alternatively, unique copy probes, or combinations thereof, may be used to identify specific chromosomal changes associated with, e.g., neoplasia.

Probes may be labeled by nick-translation, blocked for repeat sequences and hybridized to denatured metaphase chromosomes. Direct fluorochrome-labeled probes are ready for detection immediately after washing. DAPI counterstain in, e.g., an anti-fade solution, permits fluorescent metaphase identification. As needed, fluorescent G-brands may also be generated and included in the analysis.

Approximately eight different fluorochromes are available as nucleotide triphosphates for in vitro labeling procedures. Combinations of different fluorochromes, or in different ratios, permit the production of more than fifty probes that may be simultaneously hybridized and distinguished. Unique DNA probes to be labeled may include any of the thousands of clones isolated and mapped with FISH. Additionally, plasmid libraries specific for the twenty two autosomal and the X and Y chromosomes may be used to produce specific or non-specific chromosomal paints. For example, a set of probes from a specific location on a single chromosome may be simultaneously hybridized and analyzed. Increasingly larger sets of probes spanning the full length of a chromosome, each labeled differently, may be evaluated on chromosome preparations of difference lengths. Chromosome length may be determined using software (e.g., HyperScope) and DAPI pixel length.

Following the evaluation of probes on normal control metaphases, these probes may be used to evaluate metaphase preparation from previously characterized cell lines bearing known chromosome abnormalities, particularly cells with abnormalities relevant to cancer. For example, a database may be produced and scanned from the list of cell lines in the Human Tumor Cell Bank of the American Type Culture Collection (ATCC). In addition, the NIGMS Human Genetic Mutant Cell Repository offers a large number of cell lines, many with well characterized chromosome abnormalities. Selected cell lines (mostly of neoplastic origin) may be used to evaluate and quantify the ability of complex probes to identify known abnormalities including deletions, duplications, translocations, inversions, insertions, and numerical abnormalities.

In one embodiment of the present invention the hyperspectral imaging microscope can be constructed using an IX70-S1F inverted fluorescent microscope, and Spectrapro®-500I imaging spectrometer and an air-cooled CCD camera. The microscope stage can be a computer controlled MAC 2000 Motor Stage. The microscope may have five objective lenses, and three filter cases.

Light sources 22 for use with the present invention may include one or more of the following exitation sources: Argon Lasers, Helium Neon Lasers, 532 nm Solid State Lasers, or even Mercury Burners. Imaging spectrographs 28, such as the Spectrapro®-500I, may have three grating and blazings. The three gratings may have, a grating of 1200 g/mm with a blazing of 600 g/mm; a grating of 300 g/mm with a blazing of 150 g/mm; or a grating of 150 g/mm with a blazing of 75 g/mm.

Lenses

A number of objective lenses may be used with the hyperspectral imaging microscope with varying levels of magnification. Lower powered objectives may be used for coarse adjustments in image positioning, but may require the stage motor to move in larger increments when scanning, and thus, the user must inform the software which objective is being used during a given scan. The lens with the lowest magnification may be a PLANAPO 1.25×: Plan Apochromat 1.25×, with an N.A. 0.04. At a slight higher magnification a UPFL10×: 10× magnification Plan Fluorite "Universal" objective lens that is infinity-corrected, and has an F.N. 26.5; N.A. 0.30; W.D. 10.10 mm, may be used. The 10× objective may used for brightfield, darkfield, Nombarski DIC, polarization and fluorescence viewing and analysis. A 40× magnification lens may be a PLANAPO40×OI: 40× Plan Apochromat oil immersion "Universal" objective that is iris and infinity-corrected, having an F.N. 26.5; and an N.A. that is variable from 1.0 to 0.7., a W.D. of 0.14 mm and that is spring-loaded to protect the lens surface. The 40× lens may also be used for brightfield, darkfield, Nombarski DIC, polarization and high UV transmission fluorescence. For use at 60× magnification a PLANAPO 60×XO may be that is a 60× Plan Apochromat oil immersion objective, that is infinity-corrected, superwide 26.5, having a N.A. 1.4; W.D. 0.11 mm, and is spring-loaded may be used. Finally, at 100× magnification a PLANAPO 100×XO: 100× Plan Apochromat oil immersion objective lens that is infinity-corrected, superwide F.N. 26.5. N.A. 1.40; W.D. 0.10 mm and spring-loaded may be used.

Filter Cubes

Filter Cubes for use with the optics of the hyperspectral imaging microscope may be as follows. A optical filter may be an U-MWU filter having a BP 330–385 excitation filter, a DM 400 dichromatic beamsplitter and a BA 420 barrier filter. Another optical filter may be a U-MWIB filter having a BP 460–490 excitation filter, a DM 500 dichromatic beamsplitter and a BA 515 IF barrier filter. The third filter may be a modular B-MAX filter that is optimized for triple wavelength excitation of the fluorochromes: DAPI, FITC and Texas Red.

An argon laser for use with the invention may have a number of operational features that are used to improve image contrast and lighting. For example, the laser may be run in off-current mode, which shuts-off the light, while maintaining voltage to the cathode filament for instant on capability. The laser may also be set to idle mode, which switches the laser to a low current setting, thereby extended the life of the laser. The laser may also be run in interlock mode, which is a safety feature that prevents the laser from activating if all connections in the interlock loop are not made. The laser may also have internal feedback controls that detect the output of the laser and control the current from the power supply, thereby maintaining a very stable optical power output. Alternatively, the power supply may be directed to produce a constant current without regard to light output. Finally, the laser meter setting may be adjusted to indicate either current or optical output power depending on which setting is selected.

In operation, the hyperspectral imaging microscope 10 may be operated as follows. First, all the hardware components are turned on, including the stage 16 motor, imaging spectrograph 28, camera 30, camera A2S box (if present), and appropriate light source 22. The computer 32 is turned on along with, e.g., HyperScope 1.0 software. A slide 14 is mounted on stage 16 and exposed to the light source 22. A look through the eye piece 34 is used to check that the light path is clear, with particular attention to the light source 22 shutter, filter setting and shutter and side port setting. If the stage 16 is not under the control of computer software, its own joystick may be used to find an area of interest on the slide 14. Adjustments to the hyperspectral imaging microscope 10 are made as necessary, and may include: adjusting the light source 22, adjusting the position of the stage 16 position, adjusting the focus, changing the filter set (if any), increasing or decreasing the magnification of the objective 38.

Once an image has been selected and placed in the center of the field of view, the area is scanned. The size of the area to be scanned is set by the number of pictures set in the scan setup, which can be adjusted depending on the intensity and contrast of the dye. For dyes that experience bleaching or wash-out, the port of the microscope 12 that is attached to the imaging spectrograph 28 may be shut while finding an image to acquire. By closing the aperture of the light source 22 until the start the scan prevents washout of the fluorochromes on the slide 14.

Once the area of the slide 14 has been selected and the data acquired, the user may have the option to scan again or to save the results of the scan. The information relating to the scan may be save along with the data obtained during the scan, and may include: type of dye(s), patient and billing information, results, filename, magnification, light source, etc. During the scan the user will often determine if the imaging spectrograph 28 has been set to 'Pass white light' mode. If the software returns a warning about the imaging spectrograph 28 setup, an option to select 'Standard setup' from the error box before scanning is made available. The software will then start acquisition.

After a scan is completed, the software may ask the user what type of analysis to be performed on the captured data. While data may be obtained in two-dimensions (X and wavelength or Y and wavelength) a data cube will most often be captured. The scan may be reviewed immediately after a quick scan. During a quick scan, the software may integrate the light gathered over a spectrum, e.g., from about 400 to 800 nm, and the data is displayed in a results window. Using a 'Graph Point' option, a particular point in the spectrum of the scanned image may be emphasized.

The user may, alternatively, want to scan the entire slide 14. In this case, the computer 32 will generally acquire a data cube containing the spectral information from a sample on the slide 14 that is moved in relation to the path of light 20. Also, the user may re-scan with many light sources and then conduct overlays, wavelength subtractions, false coloring, etc.

Briefly, following selection of the light source(s) 22, a slide 14 is mounted on the motorized stage 16 and adjustments to the microscope 12 made (e.g., light source, stage position, focus, filter set, and objective to see an area of interest). The area to be scanned is positioned in the center of the field of view. Depending on the size of the area to be scanned, the number of pictures is set in the scan setup. By using the microscope 12 photo-frame option, the total area of the scan may be estimated. A scan of about 300 pictures will scan the region inside the inner brackets of a standard photo frame. To scan the area inside the outer photo frame brackets, approximately 700 pictures must be entered. As with the individual scan and quick scan, the light 20 entering a light port on the microscope 12 may be closed until the scan is ready to begin. Likewise, information relating to the scan, such as scan parameters and sample source may be saved along with the scan data. Also, as multiple images are being acquired, the overall acquisition time will be longer depending on the number of images acquired, and more disk space will be required. When acquiring very large data cubes, the system memory may become limiting making the data cube information harder to process.

After the scan is complete, the light source 22 may be turned off, the aperture closed or positioned in idle mode. With the hyperspectral image cube memory, the data cube obtained may be analyzed immediately, or stored for later analysis. After scanning a slide, the analysis window may automatically open to prompt the user to determine if the analysis will proceed. If the data cube to be analyzed is not already in memory, then the user may select a stored data cube. Data cubes may be selected by opening a first cube file in a series (e.g., labeled with the number 0000), or an individual data cube.

Software may be used to facilitate finding specimens or events of interest and analyzing those sites as described hereinabove. In addition to the aforementioned devices that may be moved through the field of view, analysis using the hyperspectral imaging microscope may include the examination of a flow cube or cuvette that is to examine materials that pass by the field of view of the microscope. Alternatively, stop flow fluidics may be used to momentarily stop the sample in front of the optics during data acquisition, for example, at higher resolution, before flowing the next sample into the field of view. Such a system permits the user to permit the automated analysis of sample continuously or almost continuously with or without cleaning the flow tube or cuvette.

In the clinic, examples of samples that may be analyzed using a flow-through type system include processed or unprocessed materials like blood or tumor suspensions from different patients or multiple samples from the same patient. Tumor samples, for example, may be evaluated for the presence, absence or quantification of metastatic or premetastatic cells. In the material sciences area, the sample of relevance may have certain physical or chemical characteristics that can be differentiated by the hyperspectral imaging microscope based on a change in wavelength, whether of absorption, reflection or emission. A rapid detection system having flow-through fluidics may be used to facilitate the detection, quantification and/or qualification of events, possibly rare, that reflect the presence of naturally occurring or foreign materials.

Analyzing a Hyperspectral Image Cube

The spectral information collected during a scan may be analyzed in several ways. The spectra for points on the slide 14 may be a graph of the standard intensity vs. wavelength graph. Alternatively, an entire row of data may be graphed. Spatial pictures may be constructed by integrating the data over a range of wavelengths or by fitting the data to standard curves. The user may choose a location for the data from the X-Y images constructed from the spectral information to be stored or may select to view and analyze a data cube that was previously stored. Next, the parameters for the analysis are selected. The data may be analyzed for a single dye peak or fit to a standard curve(s).

The 'Single dye peak fit' option allows a range of wavelengths to be extracted from the data cube of the hyperspectral image. The intensity at these wavelengths is integrated and an XY picture is constructed. This option is equivalent to using an optical bandpass filter. The start and end wavelengths for the range to be extracted may be edited within an 'Analyze Cube' window. The XY image is saved (e.g., as a standard 6.0 TIFF file) using the wavelength range as part of the name, for example, a file may be saved as 'test— 406–780 nm'.

Alternatively, the 'Fit to standard curves' option may be selected. The fit to standard curve option compares the spectrum collected at each point from the slide 14 to standard emission curves, which were saved earlier. The fit to standard curve option uses a curve fitting algorithm to determine the contributions of the various selected standard curves to the spectrum for each point. The results for each selected standard as well as the results for a background curve are placed in image files and displayed separately. Another option that may be made available is the ability to toggle the 'mask light source'. The 'mask light source' option allows a masking function to be applied to the standard curves and the collected spectra so the contribution from the excitation source does not interfere with the curve fitting. This option is useful if large excitation peaks are visible.

Making Pseudocolored Images

The data cube collected using a hyperspectral imaging microscope may be enhanced to differentiate portions of the image using pseudocoloring. After scanning a slide 14 and making various images from curve fitting and/or peak wavelengths, the HyperScope software may be used to overlay portions of the acquired images in pseudocolor. An overlay control may be used to pseudocolor overlayed fluorochrome images by changing the appearance of the different layers. A box filling most of the overlay control window shows the images currently displayed. Each line in the box represents one 'layer' may show whether the layer is on or off, the color of the layer, the scale of the layer, and/or the source image file name.

The first step in creating an overlay is to add the overlay, followed by selection of an image file for the overlay. Any 16-bit grayscale TIFF file created during the analysis of the data cube may be selected for the overlay. Only files that have an identical size may be overlayed. If necessary, the user may add blank data to match the data cube size. After selecting a file to be added to the overlay, a color in which to display the layer is selected. The resulting image will display the color select using the intensity of the original grayscale image. The color selected for each layer may be changed later using a 'Color' button. A 'Scale' button allows the used to select each layer independently.

The scale option is very useful if one of the fluorochromes used has a very weak or very strong signal. New layers are initially added with a scale of 1.0, but larger and smaller scales may be selected. The scale used to display the layer may be displayed next to the name and color in the list. The layers may also be toggled using an 'ON/OFF' button, which allows the user to view the layers intermittently, while leaving them in the list. The scaling option is useful to obtain a better view of overlapping areas. An ON/OFF indicator at the left side of the list shows that layers are turned on. An option to remove the scaling can also be provided in the form of a 'Remove' button, which removes layers from the list. This option is useful for cleaning-up the list or starting a new overlay. Any of the overlay images created may be saved for analysis with other applications. The images are saved, e.g., as 24-bit color TIFF files, which can be read by many other imaging packages.

Creating Standards

The results of any curve fitting analysis is dependent of the standard curves of emission spectra used for the comparison or spectral decomposition. The standards used by the hyperspectral imaging microscope and the HyperScope software may be collected from any sample, including single slides, multiple slides and multiple images. For best results, however, it is generally recommended that standards should be collected from slides with only one fluorochrome present. Standard curves will vary with the filters (if any) and light source 22 used to acquire the image. Standard curves may be recorded for each filter set that will be used for scanning slides.

Figure 5:
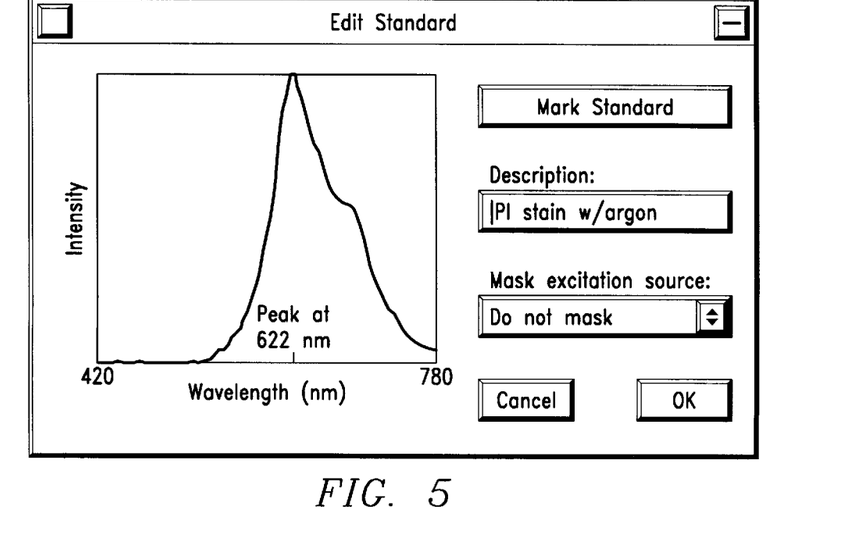
FIG. 5 shows a standard emission spectra captured using a hyperspectral imaging microscope.

FIG. 5 shows a window of the HyperScope software that was used to capture a standard spectra. As shown in the figure, a peak at 622 nm was detected using a propidium iodine stain using an argon laser. As discussed hereinbelow, the standard may be saved, modified, stored as part of an archive or deleted. One example of a modification is the removal of background to provide a sharper standard.

Figure 6:
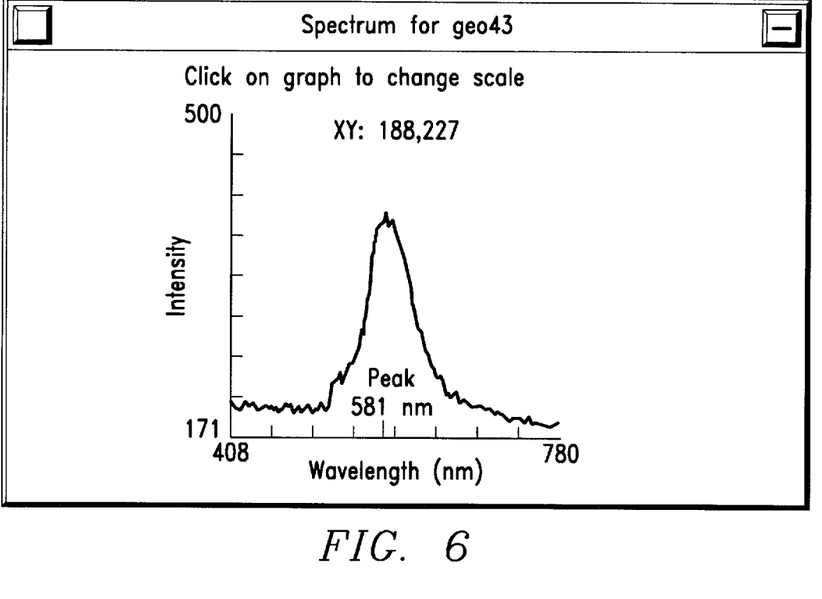
FIG. 6 shows a two dimensional graph of a measured sample.

FIG. 6 is the detected spectrum for a sample on a slide. The peak detected was at 581 nm in this example. The standard can either be stored or deleted. In addition, background can be removed from the standard at this or a later point in an analysis. In fact, nothing prevents the acquisition of multiple samples and/or standards concurrently.

Figure 7:
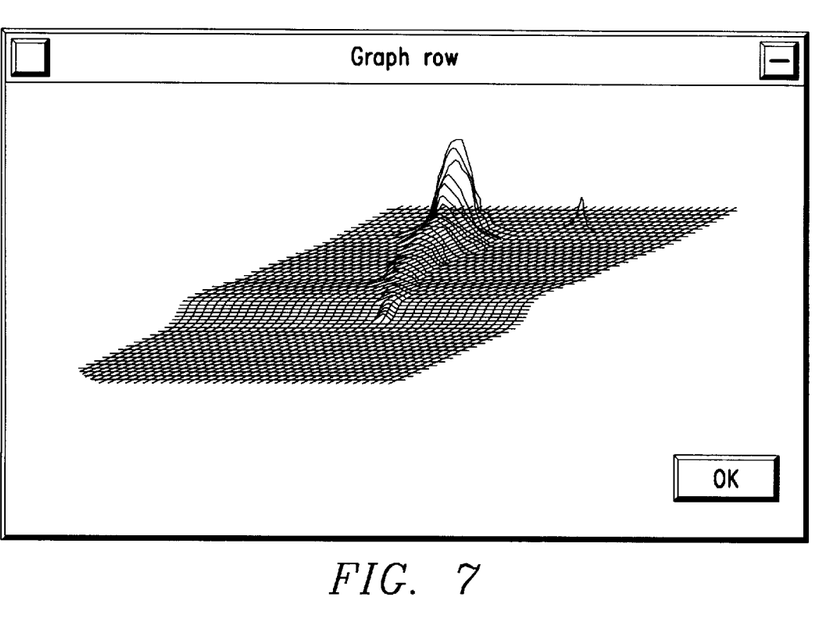
FIG. 7 shows three-dimensional data captured using a hyperspectral imaging microscope.

FIG. 7 is a three dimensional graph of the captured data. This three dimensional graph can be further processed, e.g., by comparing the data to a captured standard. Alternatively, a similar graph may be produced based on a scan on a slide, in which areas having a high emission (absorbance, reflectance, etc.) may be detected in comparison with other regions of the sample on a slide. Likewise, the data captured may be further processed to produce, e.g., an image of the acquired data that is displayed in false color, as described hereinabove. One advantage of the three dimensional view is that regions for background deletion or reduction may be selected. In addition, when using the hyperspectral imaging microscope disclosed herein to take images over a period of time, or over time in short intervals, the change in the emission (absorbance, reflectivity, etc.) can be viewed in comparison to adjacent areas of the sample.

The first step for making a new standard is generally to scan a slide 14 containing the standard of interest. Using the HyperScope software as an example, when the analysis setup window is selected, the 'Single dye peak fit' option is selected for a scan of the entire wavelength range (usually 406–780 nm). An image with a crude representation of the scan will appear. The 'Graph points' option is selected for the image to view the spectrum from a point on the scan. A region that contains a good spectrum for the standard of interest is selected from the scanned image for marking. The cursor may be moved along the image window and used to mark a region that contains the spectrum for the fluorochrome of interest. The spectra from all of the points in the area marked will be integrated to calculate a standard curve. A larger area will generally help to smooth out noisy or weak signals. If multiple fluorochromes are present on the slide, for example, a region with as little overlap as possible is generally selected. The standard may then be stored by selecting the 'Add standard' option under the 'Standards' menu, and a description for this new standard selected. Standards may be recalculated at any time or the descriptions changed by providing the user with an 'Edit Standard' option.

As a point of comparison for the standard, a background reading may be required. The software may prompt the user to mark a region containing background. The background spectrum will be subtracted from the first calculated standard spectrum. A very noisy background can lead to a noisy standard, unless, a large enough region of background is selected to smooth the noise. If the user does not want to subtract a background curve, a single point in the image is selected. Once a background has been determined, the standards are used to fill-in with the curve from the region selected. A graph may be used to display the starting and ending wavelengths of the scan, as well as, the peak wavelength found for the standard.

Imaging Spectrograph Control

Again using the HyperScope software as an example, the imaging spectrograph 28 may be controlled by the computer 32 using an imaging spectrograph control panel. The imaging spectrograph control panel may show the current settings of the imaging spectrograph 28. The grating and the current center wavelength settings may be displayed along with the system status. The grating may be changed at any time by providing the user with a spectrograph setting the command, e.g., 'X GRATING' where X is the number of the grating to be selected. The center wavelength may be selected by allowing the user to selected the center wavelength. Commands may be sent to the imaging spectrograph 28 by typing a command string having the setting instructions.

In one embodiment of the present invention, the standard setup for HyperScope is grating 3 with a center wavelength of 600 nm. The standard setup allows all wavelengths from approximately 406–780 nm to be collected from the microscope slide 14. The user may be provided with a button that is selected and sets the grating of the imaging spectrograph 28 to the standard setting. A 'Pass White Light' button may be provided that puts the imaging spectrograph 28 into a mode where light is passed directly through without being separated into its wavelength components. This option is useful during optimization of the images collected by, e.g., the HyperScope software. The white light option will also be used, for example, when cells are being differentiated based on cellular absorbance.

A 'Reset' button may also be provided that sends an initialization command to the imaging spectrograph 28. The reset option is useful if the imaging spectrograph 28 has stopped communicating with the computer 32 or is giving unexpected results.

Stage Motor Control

The stage 16 of the hyperspectral imaging microscope 10 may be controlled, manually, by use of a joystick under direct or computer control or via software. If in software, a control panel may be provided that has buttons that allow fast or slow movement in the direction indicated. Alternatively, a joystick may be provided as part of the microscope 12 or connected to the computer 32 to control the positioning of the stage 16. The joystick may be enabled with an ON/OFF toggle that turns manual movement of the stage 16 on and off. The software may also direct that the joystick be turned off during scans. The option to turn off the stage 16 control joystick may be useful to prevent the stage from accidentally being moved from an area of interest. A 'Reset' button may be provided to allow the RAM of the stage 16 controller to be reset in case of an interruption of the scan that leaves the joystick disabled.

Camera

Like the stage 16, the camera 30 may be controlled manually or via software. A control panel may be provided that contains the settings for the size of the image to be captured. The Photometrics SenSys camera, for example, has a maximum resolution of 1536×1024 pixels. The 1536 pixels are aligned in the spatial direction, and the 1024 pixels in the wavelength direction. When lower resolutions are used, the camera 30 may be directed to integrate contiguous pixels to reduce the total number of values returned. Lower resolution pictures allow a scan to be completed faster and require less disk space. A crop setting may also be provided that allows portions of the image to be ignored, further reducing the time and storage requirements. Furthermore, binning can be used to increase the camera 30 bit depth and consequently the dynamic range of data capture.

A spatial and wavelength resolution control may be provided to control these aspects of data cube acquisition by the camera 30. The spatial resolution sets the number of pixels across the image to be collected during a scan. The wavelength resolution sets the number of samples in the wavelength direction, typically 128 pixels. The control panel may also have exposure settings for the camera 30. The exposure mode, open shutter mode, clear cycles, and clear mode of the camera 30, while not normally changed, may be adjusted by the user in special cases.

The exposure time setting, for example, allows the user to set the time for each exposure of the scan. A longer exposure time will give a clearer picture, but will lengthen the time for the scan. This tradeoff is important because a longer exposure time, selected to get a clearer picture, may increase the scan time significantly and cause fluorochromes to be washed out.

Finally, a gain setting may be provided. The gain setting multiplies the values returned from the camera 30. A higher gain setting may help to make a dim image clearer.

Optimizing Images

An important aspect in optimizing the images that are obtained during a scan using the hyperspectral imaging microscope 10 is selecting a good image through the eyepiece 34. Often getting a clear and bright image can be difficult. Dim images as seen through the microscope 12 will lead to a noisy spectrum once the light has been separated into its spectral components.

To get a clearer spectral image, more light must enter the imaging spectrograph 28, and to get more light into the imaging spectrograph 28, the entrance slit must be opened. Opening the slit, however, causes a loss of spatial resolution in the direction of the scan. This tradeoff of spectral vs. spatial resolution should be considered if the quality of the images collected are poor.

To view the effects of changing the entrance slit width, the imaging spectrograph 28 is set to 'Pass white light' mode and a continuous exposure setting is selected. The entrance slit should be visible in the center of the window. If no slit is visible, the side port of the camera is inspected to ensure that light 20 is entering the microscope 12. No image will be visible if the entrance slit to the imaging spectrograph 28 is completely closed. The entrance slit width can be adjusted manually by turning the opening dial on the imaging spectrograph 28 or via software. The image of the entrance slit should get larger or smaller as the dial is turned. As the slit gets larger, more light enters the imaging spectrograph 28, and a 'Max value' reading on the computer will increase. A large maximum camera value will give a clear spectral curve, while a small value will give a weak, noisy signal.

In addition to the entrance slit width, the camera 30 settings can have an effect on the quality of the images. The exposure time setting in the camera control panel allows the user to set the time for each exposure of the scan. A longer exposure time will give a clearer picture, but will lengthen the time for the scan. This tradeoff is important because a longer exposure time, selected to get a clearer picture, may increase the scan time significantly and cause fluorochromes to be washed out. The gain setting in the camera control panel multiplies the values returned from the camera. A higher gain setting may help to make a dim image clearer.

Figure 8:
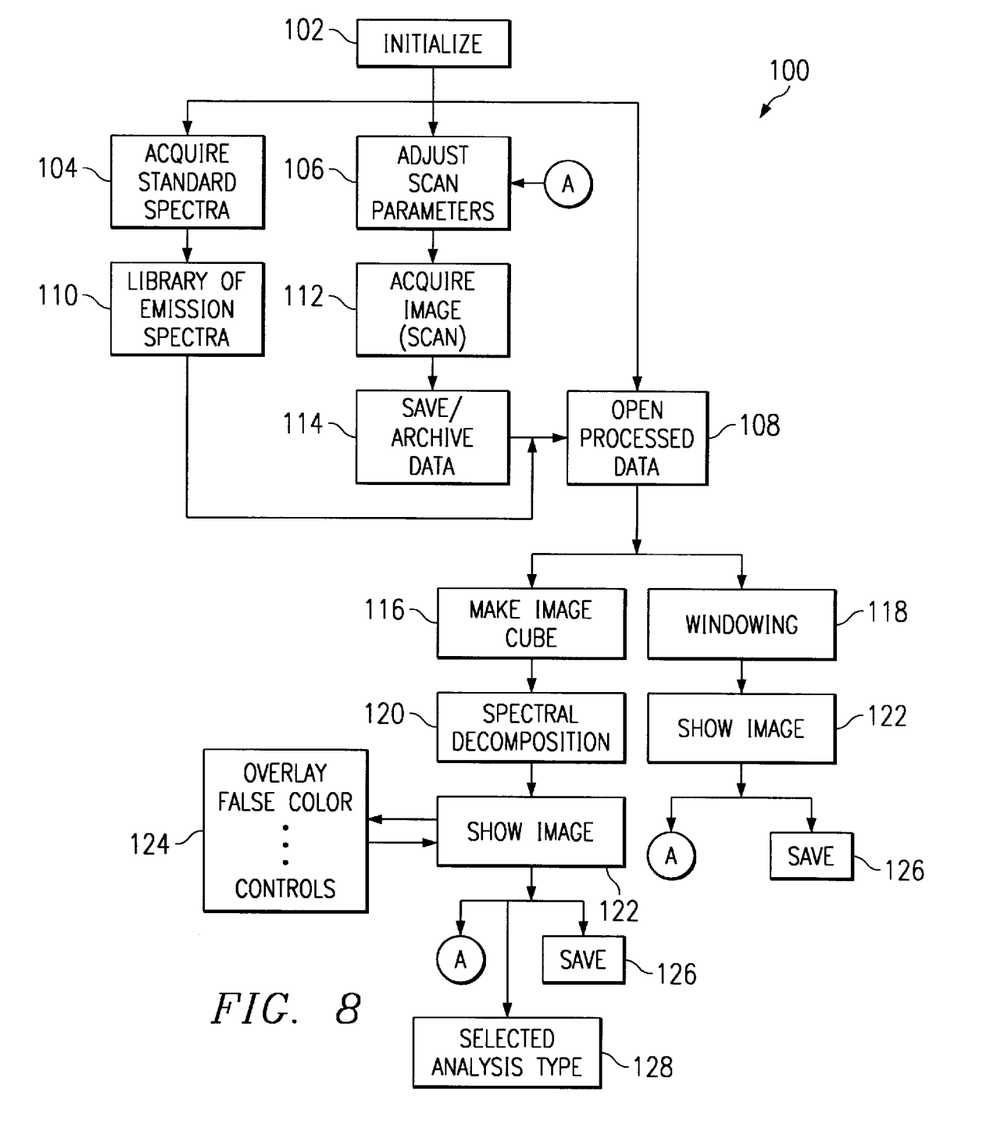
FIG. 8 is a flowchart of the basic steps used by software that acquires, scans and processes hyperspectral imaging microscope data.

FIG. 8 is a flowchart of the basic steps for using and implementing the analysis of a sample to produce an image using the hyperspectral imaging microscope, and is generally depicted as 100. In step 102, the system is initialized using, e.g., the HyperScope software in control of the hyperspectral imaging microscope components. Three paths may be followed, acquiring a standard spectra at 104, adjusting the parameters of a scan at 106 or opening previously stored data at step 108. The standard acquired in step 104 may be selected as is, or further refined, (as disclosed hereinabove) to form part of a library of emission spectra at 110.

If the user selects to acquire an image after selection of the scan parameters at 106, an image to be acquired from a sample is selected and the image is acquired via, e.g. a scan at 112. At step 114, the user may either save or archive the data of the scan from 112. The saved or archived data from 114 can be used in conjunction with the acquired standard from 104 and be opened for further analysis at the open processed data 108.

Data that has been acquired, opened and any standards for comparison may then be made into an image cube at 116 or the data for analysis can be further defined by windowing the region of data at 118. A data cube can then be subjected to spectral decomposition at 120 and the image produced thereby is displayed at 122. The displayed data at 122 may be subjected to image enhancement at 124 using, for example, overlays, false color, etc., using the controls provided for image analysis. The image can be saved at 126, printed, erased or a new region or type of analysis 128 can be selected. Else, data can be re-acquired by going to the adjust parameters step 106 via A. If windowing at 118 was selected, then the image can be shown directly at 122 and can also be saved at 126 or data re-acquired using A.

The images may be acquired once for a particular region, as part of one or multiple scans of a slide. Also, data may be captured continuously for a period of time and the changes acquired using timed scans. Alternatively, spot data analysis may be used to view a region for short periods at different time frames. For faster developing events that need to be acquired, for example, a "strobe"-like system using a pulse laser, may be used to capture data images.

Fluorochromes or dyes for use with the present invention will depend on wavelength and coupling structure compatibility. By means of example, Fluorescein-5-EX, 5-SFX, Rhodamine Green-X, Bodipy FL-X, Cy2-OSu, Fluor X, 5(6)TAMRA-X, Bodipy TMR-X, Rhodamine Red-X, Texas Red-X, Bodipy TR-X, Cy3-OSu, Cy3.5-OSu, Cy5-Osu and/or Cy5.5-OSu, or any others with compatible exitation/emission characteristics may be used with the present invention, if desired.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An imaging microscope comprising:
   a microscope;
   a light dispersive element positioned to receive spatially resolved images in two or more dimensions from the microscope at multiple wavelengths, the light dispersive element producing a spectral image from the images received from the microscope; and
   a camera positioned to detect the spectral image produced by the light dispersive element at multiple wavelengths.

2. The microscope of claim 1, further comprising:
   at least one external light source; and
   a light line generator positioned to form a light line that interacts with samples disposed on said microscope.

3. The microscope of claim 2, wherein said light source comprises an argon laser, or a diode-pumped solid state laser, or a pulsed nitrogen dye laser, or a helium-neon laser or a combination thereof.

4. The microscope of claim 2, wherein said light source comprises a broadband ultraviolet/visible lamp, or a mercury lamp, or a xenon lamp or a combination thereof.

5. The microscope of claim 1, further comprising an astigmatism corrector between said microscope and said light dispersive element.

6. The microscope of claim 1, wherein said light dispersive element comprises an imaging spectrograph.

7. The microscope of claim 1, wherein said camera is further defined as a charge-coupled device camera.

8. The microscope of claim 2, wherein said light source is further defined as producing a continiuum of light.

9. The microscope of claim 8, wherein said continiuum of light is produced by light sources is an argon laser, or a diode-pumped solid state laser, or a helium-neon laser, or a pulsed nitrogen dye laser, or a broadband ultraviolet lamp, or a mercury lamp, or a zenon lamp, or a combination thereof.

10. The microscope of claim 2, wherein said light line is further defined as comprising light produced by at least one laser or one lamp.

11. The microscope of claim 2, wherein said light source is selected to excite the fluorochrome that is used to stain samples on said slide.

12. The microscope of claim 1, further comprising:
    a microchannel plate light amplifier positioned between said light dispersive element and said camera.

13. The microscope of claim 1, further comprising a data acquisition system connected to said camera, wherein said data acquisition system stores and correlates results based on the input acquired from said camera.

14. The microscope of claim 1, wherein said camera detects a change in the absorbance of light following the interaction of light with a sample on a slide.

15. The microscope of claim 1, wherein said camera detects the reflection of light following the interaction of light with a sample on a slide.

16. The microscope of claim 1, wherein said camera detects a sample within a flow cell.

17. An apparatus for viewing samples comprising:
    one or more light source;
    a microscope positioned to receive spatially resolved light images in two or more dimensions from the one or more light sources;
    a light dispersive element positioned to split light emitted from the microscope into a light array;
    a CCD camera positioned to detect the light array, the CCD camera producing an output; and
    a data acquisition system connected to the CCD camera, the data acquisition system capable of storing and correlating results based on the output from the CCD camera.

18. The apparatus of claim 17, further comprising a light line generator positioned between said at least one light source and said microscope to form a light line that interacts with samples disposed on said microscope.

19. The apparatus of claim 17, wherein said light source comprises an argon laser, or a diode-pumped solid state laser, or a pulsed nitrogen dye laser, or a helium-neon laser, or a broadband ultraviolet lamp, or a mercury lamp, or a xenon lamp or a combination thereof.

20. The apparatus of claim 17, further comprising a cuvette holder, wherein light from said light source interacts with a sample in a cuvette within said cuvette holder.

21. The apparatus of claim 17, further comprising a flow cell, wherein light from said light source interacts with a sample within said flow cell.

22. The apparatus of claim 17, wherein said light dispersive element is an imaging spectrograph.

23. The apparatus of claim 17, further comprising an astigmatism correcting lens between said microscope and said light dispersive element.

24. The apparatus of claim 17, wherein said microscope is further defined as a linear motion drive slide mount.

25. The apparatus of claim 17, wherein said light source is further defined as producing a continiuum of light.

26. The apparatus of claim 25, wherein said continiuum of light is produced by light sources is an argon laser, or a diode-pumped solid state laser, or a pulsed nitrogen dye laser, or a helium-neon laser, or a broadband ultraviolet lamp, or a mercury lamp, or a zenon lamp, or a combination thereof.

27. The apparatus of claim 17, wherein said light line is further defined as an external light source comprising at least one laser and at least one lamp.

28. The apparatus of claim 17, wherein said samples on said microscope are stained and said light source is selected to excite the fluorochrome that is used to stain said samples.

29. The apparatus of claim 17, wherein said microscope is an epi-fluorescence microscope.

30. The apparatus of claim 17, wherein said microscope is an inverted microscope.

31. The apparatus of claim 17, further comprising a light amplifier disposed between said light dispersive element and said CCD camera.

32. A method of scanning a sample on a slide in multiple wavelengths comprising the steps of:

exposing a sample on a slide to light to produce spatially resolved images in two or more dimensions;

viewing the light through a microscope;

splitting light emitted by the sample on the slide into a two dimensional array of light; and detecting the two dimensional array of light, wherein the two dimensional array of light is representative of the emission spectra of the sample on the slide.

33. The method of claim 32, wherein said step of splitting said light line into a two dimensional array is accomplished using an imaging spectrograph.

34. The method of claim 32, further comprising the step of converting said array of light into a digital format for spectral decomposition analysis.

35. The method of claim 32, wherein said step of detecting said two dimensional array of light is further defined as hyperspectral imaging, wherein all the emission spectra are detected at high spectral resolution by a CCD camera and used to determine the relative intensities of wavelength that contributes to the output of said sample by a spectral decomposition analysis in which the signature emission spectra of said sample is compared to a known spectra.

36. The method of claim 32, further comprising the steps of:

generating a light line from a light source; and illuminating said light line through at least one sample, prior to the step of splitting light emitted by at least one sample on said slide into a two dimensional array of light.

37. The method of claim 32, wherein said sample is located within a flow cell, and wherein said sample is detected by the steps of:

introducing a sample into said flow cell; and scanning said sample, wherein a plurality of samples may be detected serially in a time dependent manner.

38. The method of claim 32, wherein said sample comprises a histological sample.

39. The method of claim 32, wherein said sample comprises a fluorescent in situ hybridization stained sample.

40. The method of claim 32, wherein said sample comprises a comparative genomic hybridization stained sample.

41. The method of claim 32, wherein said sample is further defined as comprising a microarray of samples on a slide.

42. The method of claim 32, wherein said sample is further defined as comprising one or more samples within a flow cell.

43. The method of claim 32, wherein said sample comprises a portion of a semiconductor wafer.

44. The method of claim 32, wherein said sample is detected at two or more timepoints.

* * * * *